(12) United States Patent
Prinzhausen et al.

(10) Patent No.: US 6,822,746 B2
(45) Date of Patent: Nov. 23, 2004

(54) INTERFEROMETRIC, LOW COHERENCE SHAPE MEASUREMENT DEVICE FOR A PLURALITY OF SURFACES (VALVE SEAT) VIA SEVERAL REFERENCE PLANES

(75) Inventors: Friedrich Prinzhausen, Stuttgart (DE); Michael Lindner, Leutenbach (DE); Vincent Thominet, Echandens (CH)

(73) Assignee: Robert Bosch GmbH, Stuttgart (DE)

( * ) Notice: Subject to any disclaimer, the term of this patent is extended or adjusted under 35 U.S.C. 154(b) by 281 days.

(21) Appl. No.: 10/070,693

(22) PCT Filed: Jul. 6, 2001

(86) PCT No.: PCT/DE01/02519

§ 371 (c)(1),
(2), (4) Date: Jul. 24, 2002

(87) PCT Pub. No.: WO02/04889

PCT Pub. Date: Jan. 17, 2002

(65) Prior Publication Data

US 2003/0038948 A1 Feb. 27, 2003

(30) Foreign Application Priority Data

Jul. 7, 2000 (DE) .......................................... 100 33 027
Jul. 3, 2001 (DE) .......................................... 101 31 780

(51) Int. Cl.[7] .............................. G01B 11/02; G01B 9/02
(52) U.S. Cl. ...................... 356/497; 356/450; 356/479; 356/485; 356/487; 356/491; 356/495
(58) Field of Search ................................ 356/497, 450, 356/479, 485, 487, 491, 495

(56) References Cited

U.S. PATENT DOCUMENTS 5,321,501 A  6/1994  Swanson et al. ............. 356/345
6,015,969 A * 1/2000  Nathel et al. ........... 250/227.27
6,134,003 A * 10/2000  Tearney et al. ............. 356/450

(List continued on next page.)

FOREIGN PATENT DOCUMENTS

DE  41 08 944  9/1992
DE  197 21 843  2/1999

(List continued on next page.)

OTHER PUBLICATIONS

P. de Groot, L. Deck, "Surface Profiling by Analysis of White–light Interferograms in the Spatial Frequency Domain", J. Mod. Opt., vol. 42, No. 2, 389–401, 1995**.
Th. Dresel, G. Häusler, H. Venzke, "Three–dimensional sensing of rough surfaces by coherence radar," Appl. Opt., vol. 31 No. 7, 919–925, 1992**.

Primary Examiner—Frank G. Font
Assistant Examiner—Khaled Brown
(74) Attorney, Agent, or Firm—Kenyon & Kenyon

(57) ABSTRACT

An interferometric measuring device for measuring the shape of a surface of an object has a radiation source which emits a short-coherent radiation, a beam splitter for forming an object beam which is directed via an object light path to the object and a reference beam which is directed via a reference light path to a reflective reference plane. The interferometric measuring device also has an image converter which picks up the radiation that has been brought to interference and reflected back from the surface and the reference plane and sends it to an analyzing device for determining a measurement result pertaining to the surface. To analyze the interference peak by scanning, the optical length of the object light path is altered relative to the optical length of the reference light path, or an intermediate image of the surface produced in the object light path is scanned. A rapid and accurate measurement of spatially separated surfaces is achieved by situating a superposition optics in the object light path for producing simultaneously an image of the one surface and of at least one additional surface; at least one additional reference plane being situated in the reference light path according to the number of additional surface(s) for producing different optical lengths in the reference light path, and the radiation which is brought to interference and is reflected back by the at least one additional surface and by the respective additional reference plane and is scanned with regard to the interference peak is also sent to the image converter and is analyzed in the analyzing device to determine the measurement result.

23 Claims, 5 Drawing Sheets

U.S. PATENT DOCUMENTS

| | | | |
|---|---|---|---|
| 6,208,415 B1 * | 3/2001 | De Boer et al. | 356/450 |
| 6,293,674 B1 * | 9/2001 | Huang et al. | 351/221 |
| 6,307,633 B1 * | 10/2001 | Mandella et al. | 356/479 |
| 6,384,915 B1 * | 5/2002 | Everett et al. | 356/336 |
| 6,385,358 B1 * | 5/2002 | Everett et al. | 385/12 |
| 6,421,164 B2 * | 7/2002 | Tearney et al. | 359/287 |
| 6,485,413 B1 * | 11/2002 | Boppart et al. | 600/160 |
| 6,501,551 B1 * | 12/2002 | Tearney et al. | 356/477 |
| 6,608,717 B1 * | 8/2003 | Medford et al. | 359/368 |

FOREIGN PATENT DOCUMENTS

| | | |
|---|---|---|
| DE | 198 08 273 | 9/1999 |
| DE | 199 48 813 | 10/1999 |
| DE | 100 15 878.1 | 3/2000 |
| EP | 0 534 795 | 3/1993 |

* cited by examiner

INTERFEROMETRIC, LOW COHERENCE SHAPE MEASUREMENT DEVICE FOR A PLURALITY OF SURFACES (VALVE SEAT) VIA SEVERAL REFERENCE PLANES

FIELD OF THE INVENTION

The present invention relates to an interferometric measuring device for measuring the shape of a surface of an object. The present invention includes a radiation source emitting a short-coherent radiation, a beam splitter for forming an object beam directed at the object via an object light path and a reference beam aimed at a reflective reference plane via a reference light path. The present invention also includes an image converter which picks up the radiation reflected back from the surface and the reference plane and brought to interference and sends it to an analyzing device for determining a measurement result pertaining to the surface. For the measurement, the optical length of the object light path may be varied relative to the optical length of the reference light path or scanning of an intermediate image of the surface generated in the object light path may occur.

BACKGROUND INFORMATION

A conventional interterometric measuring device is described in German Published Patent Application No. 41 08 944 which is based on the measuring principle of white-light interferometry or short-coherence interferometry. According to the measuring principle, a radiation source emits short-coherent radiation which is split by a beam splitter into an object beam which illuminates a measuring object and a reference beam which illuminates a reflective reference plane in the form of a reference mirror. To scan the object surface in the depth direction, the reference mirror is moved in the direction of the optical axis of the reference light path by a piezo control element. When the object light path corresponds to the reference light path, the maximum interference contrast is obtained in the area of the coherence length and is detected by a photoelectric image converter and a downstream analyzing device and is analyzed on the basis of the known deflection position of the reference mirror to determine the contour of the object surface.

Additional such interferometric measuring devices and interferometric measuring methods based on white-light interferometry are described by P. de Groot, L. Deck, "Surface profiling by analysis of white-light interferograms in the spatial frequency domain" J. Mod. Opt., Vol. 42, No. 2, 389–401, 1995 and Th. Dresel, G. Häusler, H. Venzke, "Three-dimensional sensing of rough surfaces by coherence radar," Appl. Opt., Vol. 31, No. 7, 919–925, 1992.

A conventional interferometric measuring device based on white-light interferometry is also described in German Patent Application No. 199 48 813 (not published previously) wherein to perform measurements in narrow hollow spaces, lateral resolution is increased by producing an intermediate image in the object light path. German Patent Application No. 100 15 878.1, likewise not published previously, proposes scanning of an intermediate image to increase the depth of focus with a relatively high lateral resolution at the same time.

There may be problems with the conventional interferometric measuring devices and measuring methods if the measurement task requires scanning of several separated surfaces which are several millimeters apart, for example, and/or are oriented at an inclination to one another.

SUMMARY OF THE INVENTION

An object of the present invention is to provide an interferometric measuring device with which at least two spatially separated surfaces may be measured with accurate and highly reproducible measurement results.

In addition to producing an image of the one surface, an image may be produced of at least one other surface. This may be achieved in the following manner. At least one additional reference plane which is used for depth scanning may be situated in the reference light path according to the number of additional surfaces for generating different optical lengths in the reference light path. The radiation reflected back by the minimum of one additional surface and the respective additional reference plane and also brought to interference and scanned for the measurement may also be sent to the image converter and may be analyzed in the analyzing device for determining the measurement result.

For example, with superposition optics or optics having a corresponding depth of focus, it may be possible to detect and image simultaneously multiple separated surfaces of the same object or different objects, e.g., a guide bore and a valve seat. Splitting the reference light path into partial reference light paths having optical lengths adapted to the different surfaces to be measured may permit simultaneous scanning or scanning in short intervals and therefore rapid scanning of the interference peaks of the various surfaces, for example. The interfering radiation of the various surfaces may be picked up by the image converter simultaneously or in succession and sent to the analyzing device for deriving measurement results, e.g., the position of the various surfaces relative to one another, the height and parallelism and/or the properties of the various surfaces themselves. This may simplify the handling and design of the measuring device.

Configuration options include a superposition optics being situated in the object light path, permitting generation of an image of the one surface and the minimum of one additional surface. Another option is for the additional surface to be imaged on the image converter either directly or via at least one intermediate image in the object light path.

Two alternative exemplary embodiments of the reference light path include a side-by-side configuration or a series configuration of the reference plane and the minimum of one additional reference plane in the reference light path, the minimum of one upstream reference plane being partially transparent in the case of a series configuration. In the case of a side-by-side configuration, different optical elements may be contained in the different partial reference arms.

Different measurement options are obtained due to the fact that the one surface and the minimum of one additional surface belong to objects positioned simultaneously or in succession, the surface and the minimum of one additional surface being situated at different distances.

According to various exemplary embodiments, the object light path for generating a common intermediate image of the surface and the intermediate image of the additional surface(s) may be formed in a common intermediate image plane in the object light path, and the common intermediate image may be imaged on the image converter either directly or via at least one intermediate image. With at least one intermediate image in the object light path, it may be possible to scan an intermediate image and also to obtain an increased lateral resolution.

In accordance with other exemplary embodiments, the reference light path may be formed in a separate reference arm or in a measurement arm belonging to the object light path.

To measure different surfaces in hard to reach places, an optical system, that is rigid relative to the object, may be situated in the object light path, and the rigid optical system may be followed by an optical system that is movable in the direction of its optical axis.

An exemplary embodiment in which the object light path is designed as an endoscope may be advantageous for narrow cavities and a measurement having a relatively high lateral resolution.

The effort of adapting the measuring device to various measurement functions may be facilitated by arranging the rigid optics as part of the optics producing the intermediate image.

To achieve a robust measurement with respect to relative lateral movement of the object, the rigid optics may produce images toward infinity.

If an image of the reference plane or the additional reference plane is within the depth of focus range of the superposition optics, this may contribute to the accuracy of the measurement. It may be advantageous that the image of the reference plane and/or the additional reference plane lie in the plane of the image of the superposition optics, and in addition, with movement of the mobile optics, the image of the reference plane and/or the additional reference plane may move in synchronization with the image plane of the superposition optics.

An exemplary embodiment of the present invention may also include the rigid optics being the optics producing the intermediate image. For example, the rigid optics may be designed as superposition optics with which at least one intermediate image that is rigid relative to the object is produced and an objective optical system designed as movable optics following behind the rigid intermediate image in the path of the beam being movable in the direction of its optical axis for scanning the intermediate image which is normal to this axis in the depth direction and being designed for imaging same directly on the image converter or via one or more intermediate images. Due to the creation of the rigid intermediate image of the object surface situated in the object light path and of the superposition optics in the object light path, the object surface to be measured may be detected with a relatively high lateral resolution even in narrow channels or boreholes and may be evaluated with regard to the depth structure by using the image converter or the downstream analyzing device. The rigid intermediate image may be scanned with relatively simple measures because only few optical components of the object light path need be moved for the depth scanning, the scanned depth of the rigid intermediate image remaining within the range of the depth of focus of the movable objective optics because, due to the depth scanning (depth scan), the object plane of the moving objective optics may likewise be moved through the rigid intermediate image, and in this manner the interference peaks may be analyzed in the area of the greatest focus. In addition, the rigid intermediate image may be aligned or alignable normal to the direction of movement of the objective optics.

With regard to further details concerning the design of the rigid optics and the movable optics, reference is made to the German Patent Application No. 101 15 524.7-52.

For a short measurement time and an accurate measurement, the relative change in the optical length of the object light path and the different optical lengths of the reference light path may occur in synchronization with one another. Measurement of the different surfaces may take place at the same time or at different times.

Possible designs include the superposition optics being designed as free-segment optics having various imaging elements for the surface and the at least one additional surface being designed as multifocal optics or as optics having a depth of focus of at least the greatest optical path difference of the at least two surfaces. A free-segment optical system having multiple light deflection surfaces and lens elements, for example, may be suitable for registering surfaces oriented at an inclination to one another, which may also yield object light paths of different lengths, e.g., for measuring the thickness, diameter or alignment of reference surfaces. A multifocal optics may be suitable, for example, if surfaces oriented parallel to one another and perpendicular to a main beam path of the object light path are to be observed, e.g., measuring of parallelism, thickness and height, whereas optics having a depth of focus of at least the greatest optical path difference of the at least two surfaces may permit simultaneous detection of surfaces oriented parallel to one another with a corresponding distance between them, e.g., measuring of parallelism, thickness and height.

To achieve accurate measurement results, an optical fiber may be provided for illuminating the object with a planar wave, its output on the object end being situated in a telecentric imaging arrangement of the object light path, or an illumination light path having additional lenses and deflector elements may be formed.

The measurement may be made possible or further facilitated by the feature that the reference light path has optics similar or identical to that of the object light path, making it possible to produce the interference or optimize the interference contrast or compensate for optical effects of the components in the object light path.

DETAILED DESCRIPTION

Figure 1:
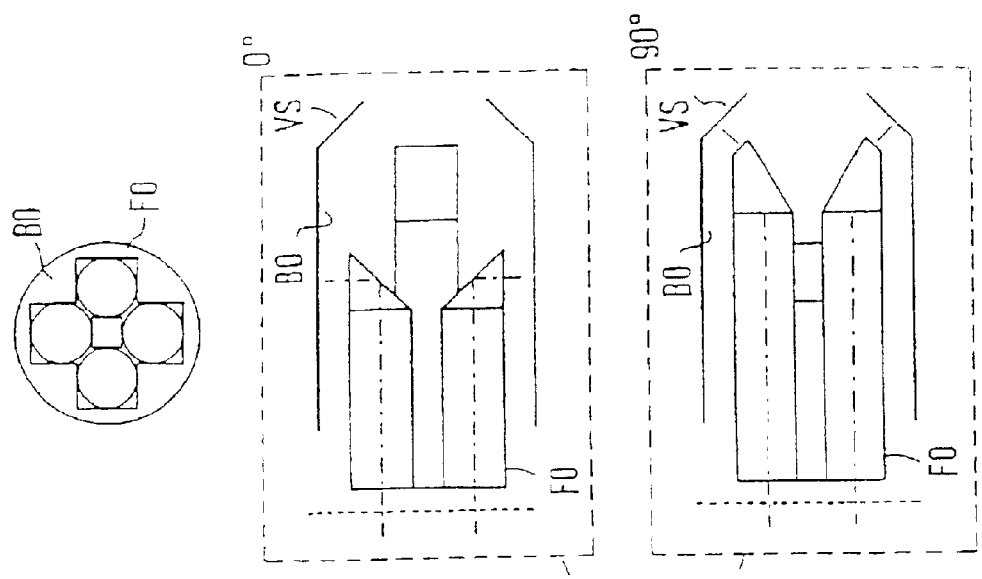
FIG. 1 is a schematic diagram of an interferometric measuring device according to the principle of white-light interferometry (short-coherence interferometry) having a reference light path having two partial reference light paths and a free-segment optical system, the free-segment optical system being illustrated in two positions rotated by 90° relative to one another.
Figure 1:
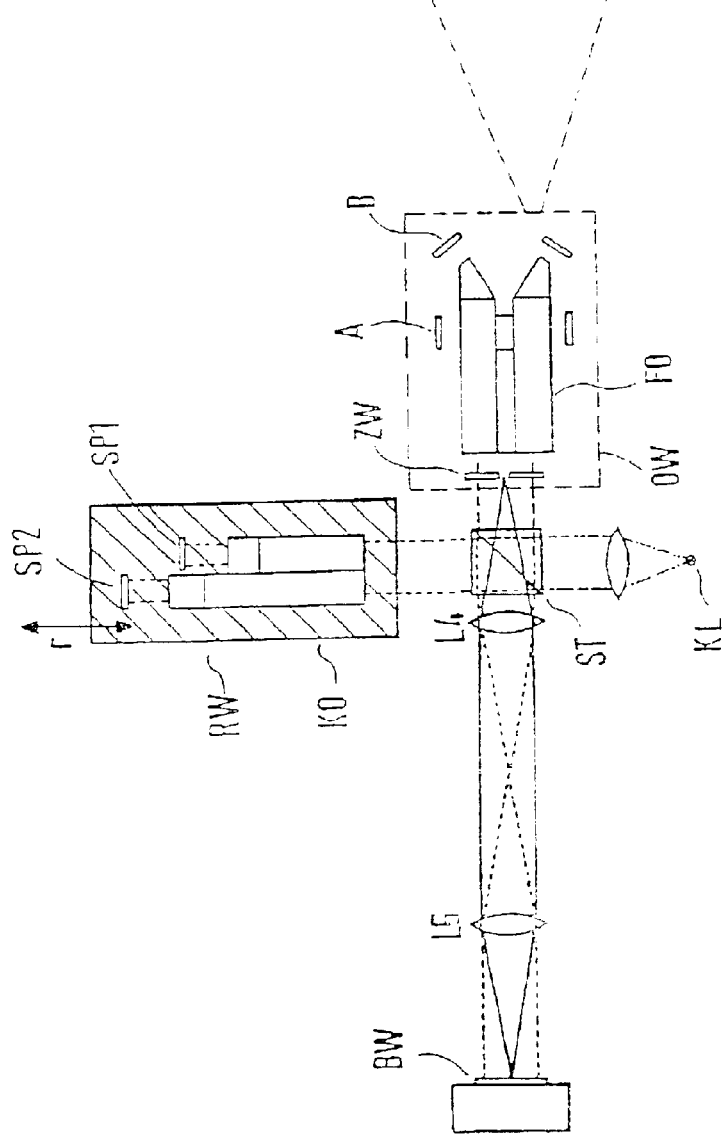

As shown in FIG. 1, an interferometric measuring device based on the principle of white-light interferometry (short-coherence interferometry) has an object light path OW, a reference light path RW, an image converter BW and a downstream analyzing device. This makes use of the feature that interference may occur only in the area of the coherence length, thus permitting simple coordination of the optical path lengths of reference light path RW and object light path OW as well as detection of the interference peak. Radiation emitted by a short-coherent light source KL has a coherence length on the order of 10 μm, for example. The radiation of short-coherent light source KL is split by a beam splitter ST into a reference beam, which is guided via reference light path RW, and an object beam, which is guided via object light path OW. A fourth and fifth lens L4, L5 are situated in the light path to image converter BW for imaging.

One particular feature of the interferometric measuring device illustrated in FIG. 1 is that two partial reference light paths having different optical path lengths may be formed in reference light path RW, these reference light paths being formed by laterally offset reflective surfaces situated a distance apart from one another with respect to the optical axis, namely a first mirror SP1 and SP2. Reference light paths RW contain compensation optics KO corresponding or similar to respective object light path OW.

As an additional feature, superposition optics in the form of a free-segment optics FO may be situated in object light path OW and shown in cross section (top diagram) in a 0° view in the illustration shown at the right (middle diagram) and in a 90° view (bottom diagram) in a state in which it is guided into a valve bore BO in proximity to a valve seat VS. Several separate surfaces A, B of bore BO or of valve seat VS may be detected at the same time with free-segment optics FO and imaged in a common intermediate image ZW in an intermediate image plane in the object light path, which is perpendicular to a main optical axis of object light path OW. Free-segment optics FO has several light deflecting surfaces and imaging lens elements and is adapted to the respective measurement requirements. In particular, surfaces A, B situated at different distances from common intermediate image ZW and also situated at an inclination to one another may be detected and imaged in the common intermediate image ZW.

The partial reference light paths having first mirror SP1 and second mirror SP2 are adapted to various optical path lengths corresponding to surfaces A, B. Detection of the interference peaks corresponding to two surfaces A, B occurs through a change in reference light path RW corresponding to a scanning direction r, the two partial reference light paths being altered in synchronization. The moving unit is shown with broken lines.

Figure 2:
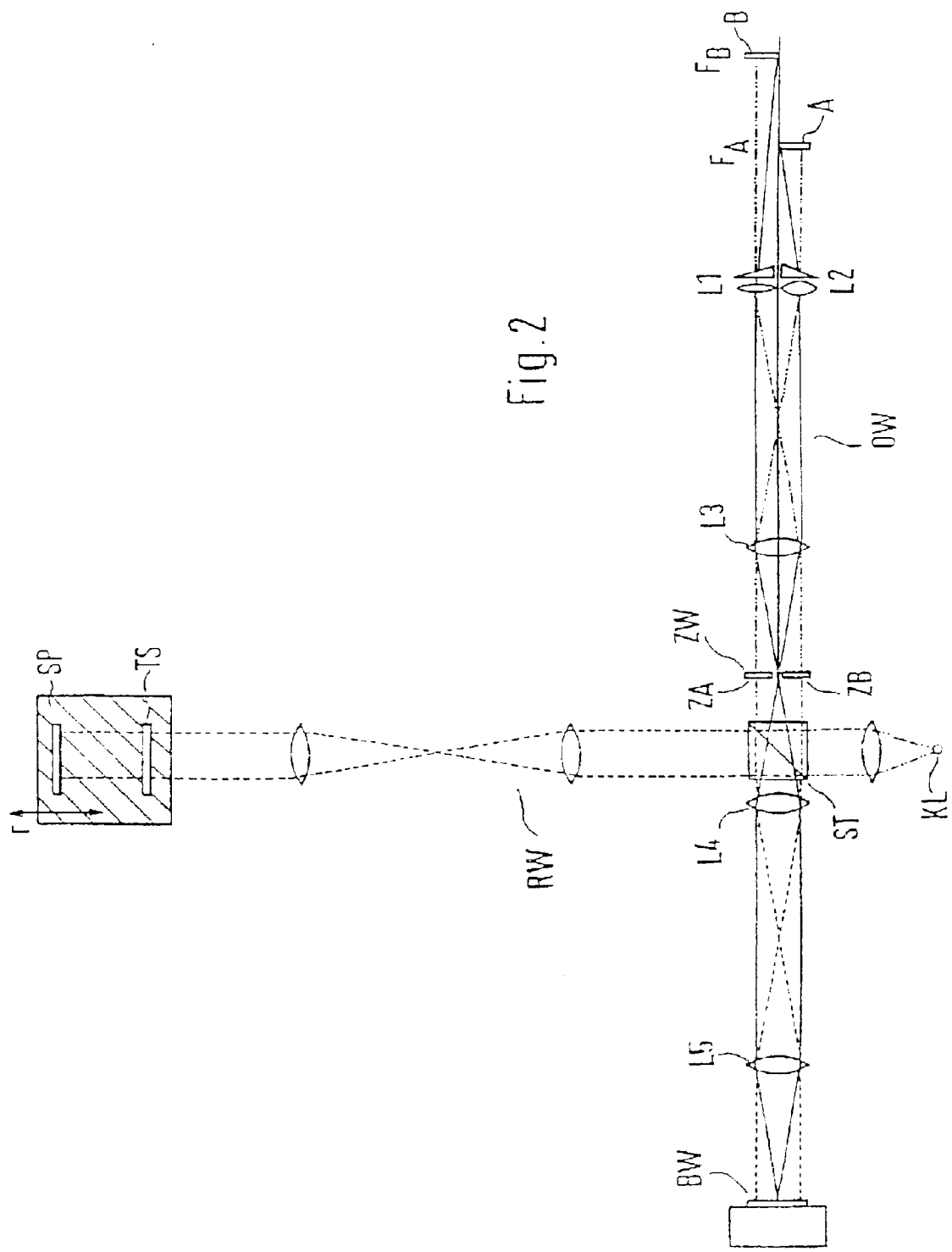
FIG. 2 illustrates another exemplary embodiment of the interferometric measuring device, two partial reference light paths being formed via a mirror and a partially transparent mirror placed in front of it and superposition optics having separate lens elements being formed in the object light path.

In the exemplary embodiment of the interferometric measuring device illustrated in FIG. 2, two partial reference light paths of reference light path RW are formed by an outer mirror SP and a partially transparent mirror TS situated upstream from the former. Superposition optics situated in object light path OW have two lenses connected in parallel, namely a first lens L1 and a second lens L2 having different focal distances, optionally with prism-shaped elements situated in front of them. The object light path may also be designed for producing a telecentric image. Surfaces A, B situated parallel to one another and different distances apart, e.g., a few μm to more than 1 cm, and perpendicular to the main optical axis of object light path OW are imaged in an intermediate image plane in the object light path with two lenses L1 and L2 in common intermediate image ZW composed of intermediate image ZA of surface A and intermediate image ZB of surface B. The focal distances of first and second lenses L1, L2 are given as $F_A$, $F_B$. In addition, a third lens L3 for imaging is situated in the beam path of object light path OW. For detecting the interference peak, the unit of mirror SP and partially transparent mirror TS is moved in scanning direction r so that the changes in the two partial reference light paths occur in synchronization.

Figure 3:
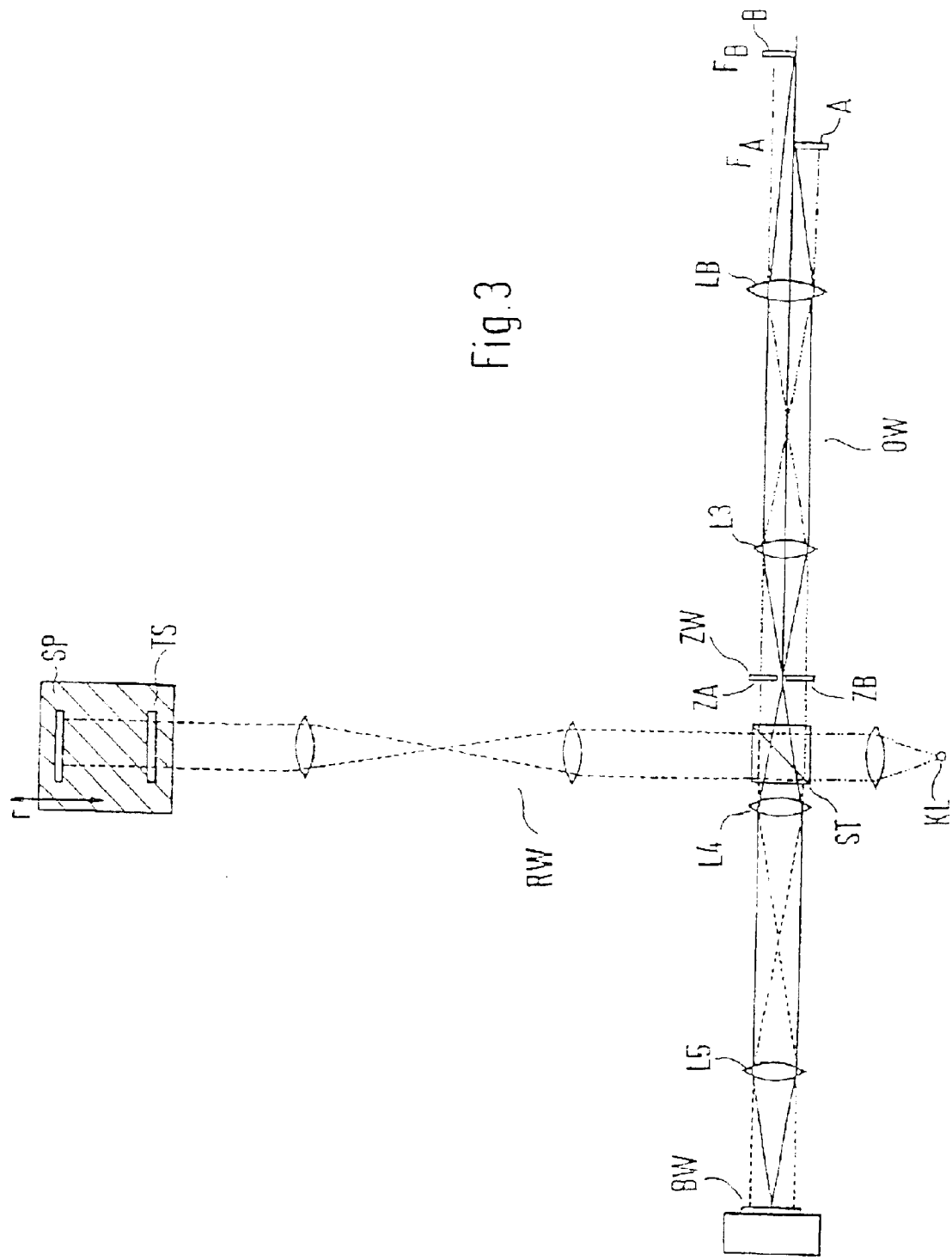
FIG. 3 illustrates another exemplary embodiment of an interferometric measuring device, bifocal optics being situated in the object light path.

FIG. 3 illustrates an exemplary embodiment of the interferometric measuring device in which instead of two lenses L1, L2 in FIG. 2, a bifocal optics LB is situated, its properties corresponding approximately to those of two lenses L1, L2.

Figure 4:
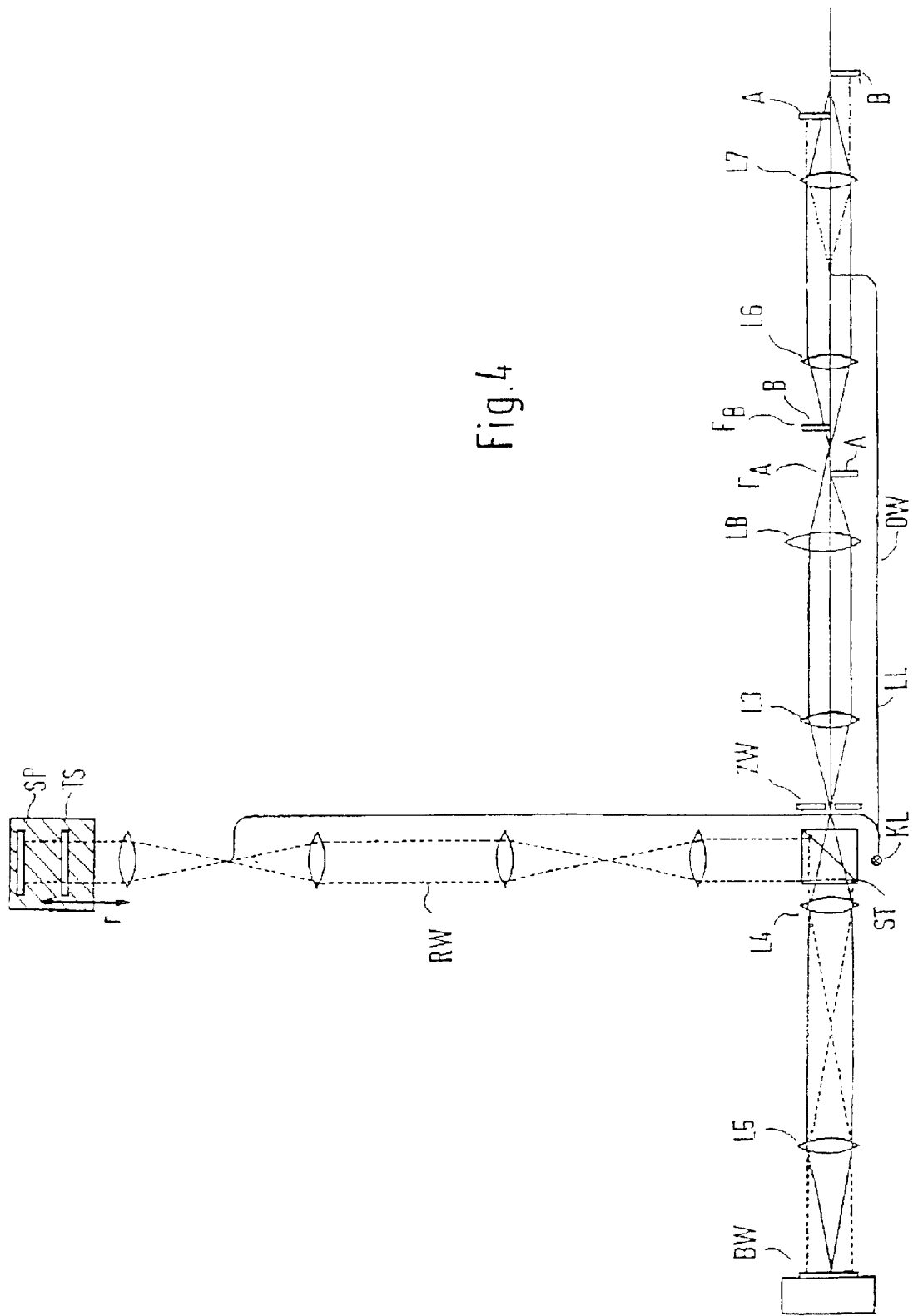
FIG. 4 illustrates another exemplary embodiment of an interferometric measuring device in which the radiation in the reference light path and the object light path is guided with optical fibers.

In the exemplary embodiment illustrated in FIG. 4, additional lenses L6, L7 are introduced into the beam path of the object light path of bifocal optics LB on the object side. In addition, an optical fiber LL via which short-coherent radiation is conveyed from radiation source KL to illuminate surfaces A, B with a planar wave front via additional lens L7 is also situated in object light path OW. Corresponding lenses are also situated in reference light path RW for compensation and the radiation is also passed in the object light path via an optical fiber.

Figure 5:
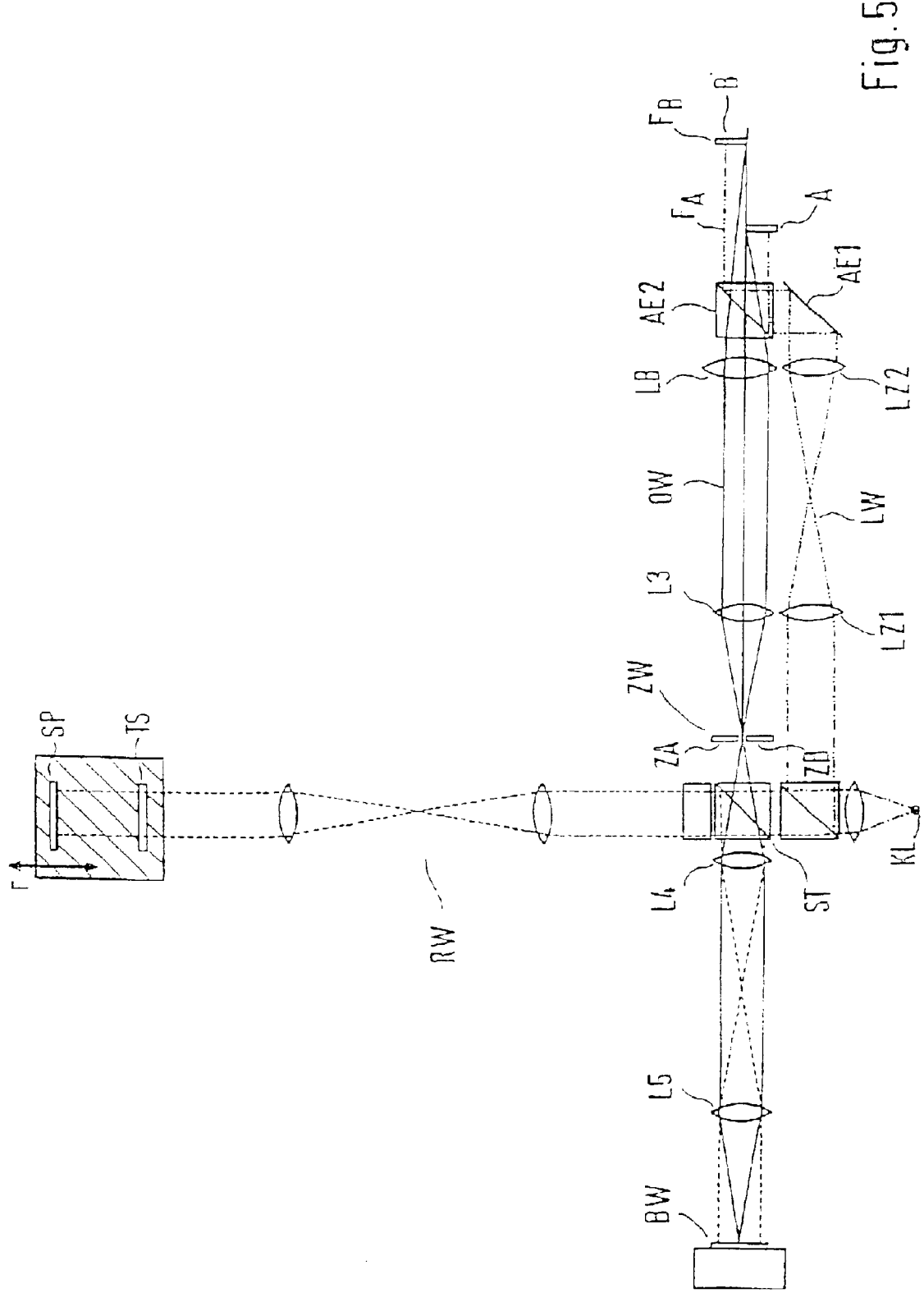
FIG. 5 illustrates another exemplary embodiment of the interferometric measuring device in which the radiation is guided in the object light path via an illumination light path having lenses and deflector elements.

In FIG. 5, in comparison with FIG. 4, optical fiber LL in object light path OW is replaced by an imaging light path LW having discrete additional lenses LZ1, LZ2 and deflector elements AE1, AE2 to illuminate surfaces A, B with a planar wave. Additional lenses L6, L7 are not provided.

Surfaces A, B that are spatially separated from one another may be measured at the same time using the interferometric measuring devices described above and special optics in the form of the superposition optics mentioned above. The distance, and/or thickness, diameter and parallelism of spatially separated surfaces A, B may be measured in this manner. The spatially separated surfaces may be imaged on image converter BW directly or over a common intermediate image ZW in the object light path.

Common intermediate image ZW may be imaged directly or via one or more intermediate images on image converter BW, e.g., a CCD camera.

With the partial reference light paths and the different optical path lengths achieved in this manner, different surfaces A, B may be measured in a rapid and stable manner. The optical path lengths may be adjusted according to the measurement task and may be almost balanced with the optical path lengths of spatially separated surfaces A, B of object light path OW.

The design of the interferometric measuring device may be implemented in the form of a Michelson interferometer, for example. Short-coherent radiation source KL may be, for example, a superluminescence diode or an LED. With illumination through the superposition optics, spatially separated surfaces A, B of the object are illuminated, separate surfaces A, B are illuminated with almost planar waves.

The superposition optics in the form of free-segment optics FO may be composed of various individual lens systems for example which image different surfaces along different optical axes and with different optical path lengths in the common intermediate image plane. Free-segment optics FO may be implemented in the form of optical elements such as spherical lenses, aspherical lenses, rod lenses or Grin lenses or defractive optical elements, prisms or mirrors, which may also be combined.

Instead of the design of superposition optics as a bifocal optics LB, multifocal optics may also be used if more surfaces are to be measured. The multifocal optics may be combined with another lens to form a telecentric arrangement, for example.

For compensation of the optical path lengths and the dispersion in both arms of the interferometer, namely reference light path RW and object light path OW, the fiber lengths and geometries of the optical fibers used may need to be as identical as possible.

The superposition optics may be implemented approximately by optics having a great depth of focus or with an expanded focal distance such as Axicon.

In the case of multifocal optics or bifocal optics as the superposition optics, optics having only one focal plane may also be used for compensation in reference light path RW, as shown in FIG. 3.

An image of surfaces A, B to be observed superimposed by the reference wave may be produced on image converter BW. For data analysis, a change may be produced in the pitch difference between the optical path lengths in the object light path and the reference light path (deep scan), the change being caused by scanning movement r, for example. Various procedures may be used to change the difference in pitch, e.g., movement of the reference mirror, movement of the object in the depth direction, movement of the objective in the depth direction, movement of the entire sensor relative to the object or intermediate image scanning according to German Patent Application No. 100 15 878 or a change in the optical path length due to acousto-optical modulators.

A high interference contrast may occur in the image of the object when the pitch difference in both interferometer arms is smaller than the coherence length. To obtain the 3D height profile, various methods are established, based on the feature that the pitch difference at which the highest interference contrast occurs is detected during the depth scanning for each image point (pixel).

What is claimed is:

1. An interferometric measuring device for measuring a shape of a surface of an object, comprising:
   a radiation source configured to emit a short-coherent radiation;
   a beam splitter configured to receive the short-coherent radiation and form an object beam and a reference beam, the object beam directed via an object light path to the object, the reference beam directed via a reference light path;
   a reflective reference plane and at least one additional reference plane arranged in the reference light path to receive and reflect the reference beam, the at least one additional reference plane corresponding to a quantity of at least one additional surface, the at least one additional reference plane used for producing different optical lengths of the reference light path and for depth scanning;
   an image converter configured to detect radiation reflected back from the surface and the reference plane and brought into interference, the image converter further configured to detect radiation reflected back from the at least one additional surface and the at least one additional reference plane and brought to interference, the image converter further configured to transmit the detected radiation; and
   an analyzing device configured to receive the transmitted radiation and to determine a measurement result pertaining to the surface,
   wherein to determine the measurement result, one of:
      an optical length of the object light path is altered relative to an optical length of the reference light path; and
      an intermediate image of at least one of the surface and the at least one additional surface produced in the object light path is scanned.

2. The measuring device according to claim 1, further comprising:
   a superposition optics arranged in the object light path for producing an image of the surface and the at least one additional surface.

3. The measuring device according to claim 1, wherein the at least one additional surface is imaged on the image converter one of directly and via at least one intermediate image in the object light path.

4. The measuring device according to claim 3, wherein the reference plane and the at least one additional reference plane are arranged one of side by side and sequentially in the reference light path, wherein if arranged sequentially, at least one upstream reference plane is partially transparent.

5. The measuring device according to claim 1, wherein the surface and the at least one additional surface belong to objects positioned one of simultaneously and in succession, the surface and the at least one additional surface of the objects being different distances apart.

6. The measuring device according to claim 1, wherein the object light path for producing a common intermediate image of an intermediate image of the surface and an intermediate image of the at least one additional surface is formed in a common intermediate image plane in the object light path, the common intermediate image imaged on the image converter one of directly and via the at least one intermediate image in the object light path.

7. The measuring device according to claim 1, wherein the reference light path is formed in one of:
   a separate reference arm; and
   a measurement arm belonging to the object light path.

8. The measuring device according to claim 2, further comprising:
   a rigid optics arranged in the object light path, the rigid optics being rigid with respect to the object; and
   a movable optics arranged to follow the rigid optics, the movable optics movable in a direction of an optical axis of the rigid optics.

9. The measuring device according to claim 1, wherein the object light path is defined by an endoscope.

10. The measuring device according to claim 8, wherein the rigid optics is configured one of partially and entirely as an endoscope.

11. The measuring device according claim 8, wherein the rigid optics is part of an optics producing the intermediate image.

12. The measuring device according to claim 8, wherein the rigid optics is part of the superposition optics.

13. The measuring device according to claim 8, wherein the rigid optics is configured to image toward infinity.

14. The measuring device according to claim 8, wherein an image of the reference plane and of the additional reference plane is arranged in a range of a depth of focus of the superposition optics.

15. The measuring device according to claim 8, wherein an image of the reference plane and an image of the additional reference plane are arranged in an image plane of the superposition optics.

16. The measuring device according to claim 8, wherein with a movement of the movable optics, an image of the reference plane and of the additional reference plane moves in synchronization with an image plane of the superposition optics.

17. The measuring device according to claim 8, wherein the rigid optics is configured to produce at least one rigid intermediate image relative to the object and oriented normal to the rigid optics in a depth direction; and the movable optics is an objective optical system configured to follow behind and scan the at least one rigid intermediate image in a path of the object beam, the movable optics configured to image the at least one rigid intermediate image on the image converter one of directly and via at least one intermediate image.

18. The measuring device according to claim 8, wherein the intermediate image has a same image scale for all object points imaged in an intermediate image.

19. The measuring device according to claim 8, wherein the rigid optics is configured as a 4f configuration.

20. The measuring device according to claim 1, wherein a relative change in the optical length of the object light path and the different optical lengths of the reference light path occurs in synchronization.

21. The measuring device according to claim 2, wherein the superposition optics is configured as one of:

free-segment optics having different image elements for the surface and the at least one additional surface; and multifocal optics having a depth of focus of at least a greatest optical path difference of the surface and the at least one additional surface.

22. The measuring device according to claim 1, further comprising:

an optical fiber configured to illuminate the object with a planar wave via one of:

an output at an object end arranged in a telecentric image arrangement of the object light path; and an illumination light path formed with additional lenses and deflector elements.

23. The measuring device according to claim 8, further comprising:

optics arranged in the reference light path, the optics being one of identical and similar to those arranged in the object light path.

* * * * *